No. 642,139. W. LITTLEWOOD. Patented Jan. 30, 1900.
APPARATUS FOR PRODUCING LITERATURE FOR USE BY THE BLIND.
(Application filed Feb. 1, 1899.)

(No Model.)

WITNESSES
R. Ovendale.
Joseph Bates

INVENTOR
Walter Littlewood
by I. O'Wann O'Brien
atty.

UNITED STATES PATENT OFFICE.

WALTER LITTLEWOOD, OF LIVERPOOL, ENGLAND, ASSIGNOR TO GREEVZ FISHER, OF LEEDS, ENGLAND.

APPARATUS FOR PRODUCING LITERATURE FOR USE BY THE BLIND.

SPECIFICATION forming part of Letters Patent No. 642,139, dated January 30, 1900.

Application filed February 1, 1899. Serial No. 704,204. (No model.)

*To all whom it may concern:*

Be it known that I, WALTER LITTLEWOOD, a subject of the Queen of Great Britain, residing at Liverpool, in the county of Lancaster, England, have invented certain new and useful Improvements in Apparatus for Producing Literature for Use by the Blind, of which the following is a specification.

The object of this invention is to provide apparatus for producing or "printing" literary matter in the Braille character or notation of reading and writing or any other system in which raised or embossed dots are used and which dots are read by the sense of touch. Such apparatus is so designed as to enable the "setting up" and embossing to be done by the blind. Heretofore the em-embossing or printing of sheets in the Braille or point system has been from embossed metal plates punched by a hand-tool, or each paper sheet has been written or embossed by a style by hand dot by dot and letter by letter.

By this invention the matter is first set up in complete form and the embossing or printing of an entire sheet of brass or paper is effected at one impression.

The invention consists, essentially, of two plates of metal, with alternate rows of holes and indents arranged in accordance with the Braille or point system, the holes in one plate corresponding to or being complementary to the indents or "pits" in the other, a number of headed pins for insertion in the holes of the plates, and two outer plates or presses against which the heads of the pins rest and by which the perforated plates and pins are pressed together for the purpose of printing. It will be fully described with reference to the accompanying drawings.

Figure 1:
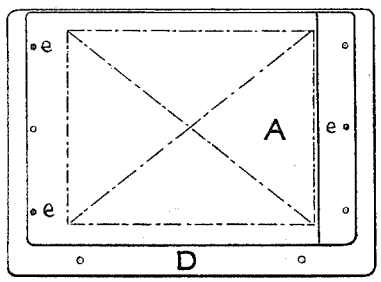
Figure 3:
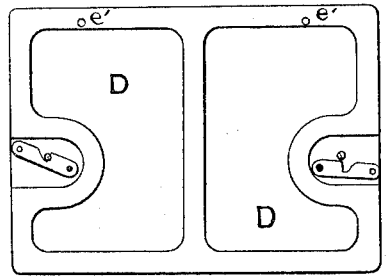
Figure 2:
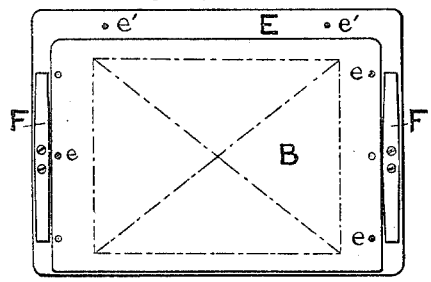
Figure 4:
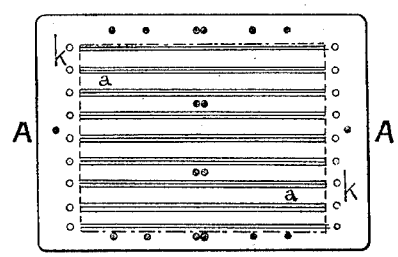
Figure 5:
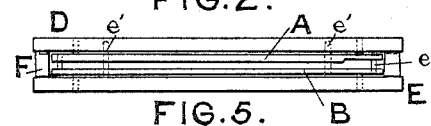
Figure 6:
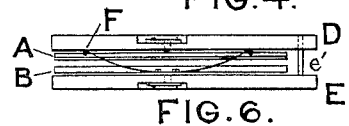
Figure 7:
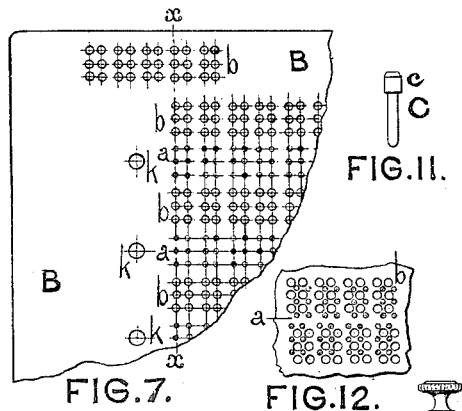
Figure 12:
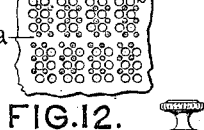
Figures 8, 11:
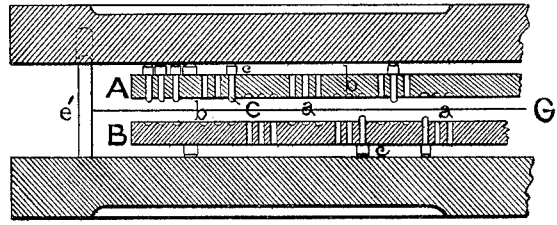
Figure 9:
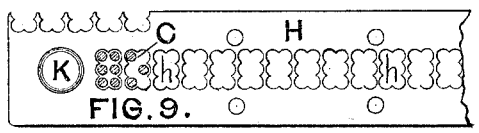
Figure 10:
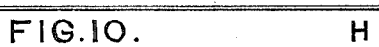

Figure 1 is a face view of the upper pair of plates, the space within the dotted lines representing the portion drilled with holes and pits or indents. Fig. 2 is a similar face view of the lower pair of plates. Fig. 3 is a view of back of one of the outer plates. Fig. 4 is a view of back of one of the inner or perforated plates. Fig. 5 is a front elevation of the apparatus in position for printing or use. Fig. 6 is an end elevation of same. Fig. 7 is an enlarged detail face view of part of one of bottom inner or perforated plates. Fig. 8 is an enlarged end elevation of a part of the apparatus in section on line $x\,x$, Fig. 7. Fig. 9 is a plan of guide-frame. Fig. 10 is a side elevation of guide-frame. Fig. 11 is an elevation of pin, greatly enlarged. Fig. 12 is a face plan showing a modified arrangement of the perforations, pits, and indents, the indents being placed between the perforations to produce a closer "writing," termed "interpointed."

Two plates of metal A and B, of brass or other metal suitably tempered, are employed, each of a superficial area suited to the size of sheet to be embossed or printed with a margin of about one inch or so all around and about one-eighth or one-fourteenth of an inch in thickness.

In each plate A and B as designed for embossing both sides of a sheet simultaneously are formed holes $a$ and pits $b$ (small cupped recesses) in alternate sets of rows—namely, one set of rows of holes $a$ and one set of rows of pits $b$. The rows of holes $a$ in one plate are arranged opposite to the rows of pits $b$ on the face of the other plate.

For plates designed for embossing one side of a sheet one plate will be formed with holes $a$ only and the other with pits $b$ only; but it is customary in the Braille system to print or emboss both sides of the sheet in alternate rows.

The holes $a$ and pits $b$ in the plates A and B are formed or arranged in groups of six to correspond with the six dots of the Braille characters.

A number of "pressers" or points consisting of small pins C of metal, with rounded points of equal length, are provided to be fitted into the holes $a$ in one or other, or both, of the plates A and B from the back. The pressers or pins C are formed with a small head or enlargement $c$ on one end to prevent them passing through the holes $a$ farther than the desired amount of projection, as shown in Figs. 8 and 11.

The pins or pressers C are slightly longer than the thickness of the plates and are inserted into the holes $a$ in the plates A and B from the back and project through for a short distance on the face to form the characters to be embossed, and the operation is carried on from right to left of the plates, so that when reversed the characters read from left to right. The projecting points of the pins represent the Braille characters.

Behind or at the back of each of the two plates A and B is fitted or secured a back plate D and E, which rest against the heads of the pins C and lock or retain them in position. The points then all project a uniform height beyond the surface of the plate, into the holes $a$ of which they have been inserted.

To the back of the plates A and B are attached a number of studs $d$, placed in convenient position to cause the back plates D and E to bear uniformly and with an even pressure over the heads $c$ of the pins C, and a number of guide-pins $e$ project from one of the inner perforated plates A and B and engage with holes in the other to secure correct register when the two plates are brought face to face, and two or more similar guide-pins $e'$ project from one of the back plates D or E and engage with holes in the other to keep them in position. The guide-pins $e'$ are preferably placed at one edge of the plates and also serve as a stop or gage for the sheets G, of paper or other material, as they are inserted.

On one of the plates, preferably on the lower inner one B, are placed two springs F to raise and maintain the plates out of contact for the insertion of the sheets G and to separate them after each sheet has been embossed. The springs F are of a kind that do not raise the upper plate sufficiently high to allow it to get out of place.

In operation a weight or pressure is applied to the plates to bring them into contact, and the sheet is embossed by the pins C projecting from the holes $a$ in one plate A or B entering the pits or indents $b$ in the opposite plate B or A. The pressure may be applied by screw, spring, or other pressing device which presses the two plates evenly and firmly together.

To facilitate the setting of the pins C in the holes by the blind, a movable gage H similar to that employed for writing Braille characters by hand may be employed to extend across either plate A or B and comprising a single row of interstices $h$. One interstice corresponds to or agrees with a set of six holes $a$. The gage H is held temporarily by stud K and holes $k$, and each interstice $h$ is provided with six notches, corresponding with the holes $a$ in the plates A and B and serving to guide the pins into such holes.

What I claim as my invention, and desire to protect by Letters Patent, is—

In apparatus for printing or embossing sheets of literature for the use of the blind the combination with two plates A and B perforated and pitted at $a$ and $b$ to correspond with the Braille characters of a number of embossing-pins C for insertion in the perforations $a$ from the back of the plate, the heads $c$ on the pins C to prevent them passing through the plates, two back plates D and E clamped to the plates A and B to lock or maintain the embossing-pins C in position the studs $d$ affixed thereto guide-pins $e$ projecting from one plate to the other and springs F to raise and maintain the plates out of contact substantially as described.

In witness whereof I have hereunto signed my name, in the presence of two subscribing witnesses, this 14th day of January, 1899.

WALTER LITTLEWOOD.

Witnesses:
    JOSEPH F. O'BRIEN,
    HERBERT BRADLEY.